MULTIPLE REELING DEVICE

Filed July 25, 1958

Stephen A. Brady
INVENTOR.

BY Robert J Patton
ATTY 3,000,588
Patented Sept. 19, 1961

3,000,588
MULTIPLE REELING DEVICE

Stephen A. Brady, 4604 E. 25th St., Tulsa, Okla.

Filed July 25, 1958, Ser. No. 750,910
1 Claim. (Cl. 242—86.5)

The present invention relates to a multiple reeling device, and more particularly to a device comprised of a plurality of reels each adapted to wind or unwind an indeterminate length of material onto or from the reel. The invention has utility in a plurality of applications in which it is desired to wind or unwind simultaneously a plurality of strands of material such as cable, rope, electric wires, telephone lines and so on; and it will be described by way of example in connection with the operation of stringing telephone lines by drawing them across the cross arms located adjacent the tops of telephone poles.

In the installation of telephone lines as described above, it has in the past been customary to pay out a single line from a vehicle-mounted drum on which the line is coiled and to dispose the line over the cross arms of the telephone poles seriatim. Naturally, this has been a slow and laborious process, and it is obvious that it would be advantageous to be able to string or take down a plurality of lines at the same time. For example, if a line of poles carries four wires, it is clear that it would be much cheaper and quicker to install or remove all four lines at the same time.

Unfortunately, it is difficult if not impossible to work with a plurality of lines simultaneously without maintaining any individual line either too taut or too slack. For example, if an individual line is drawn too taut it may snap, and if it becomes too slack it may sag to the extent that it touches high power lines in the vicinity.

Although a number of attempts have been made to overcome the foregoing and other difficulties and disadvantages of the prior art in this field, none, as far as is known, has been entirely successful when practiced commercially on an industrial scale.

Accordingly, it is an object of the present invention to provide a multiple reeling device adapted to wind or unwind a plurality of strands in a uniform fashion.

Another object of the present invention is the provision of a multiple reeling device in which the reeling units are adapted for either individual or conjoint operation, and to provide such a multiple reeling device in which the individual reeling units are separately removable from the assembly without disturbing the remainder thereof.

Finally, it is an object of the present invention to provide a multiple reeling device which will be relatively inexpensive to construct, compact in its arrangement, easy to operate in any of a variety of operative combinations of the individual units thereof, and rugged and durable in use.

Other objects and advantages of the present invention will become apparent from a consideration of the following description, taken in connection with the accompanying drawing, in which.

Figures 1, 2, 3:
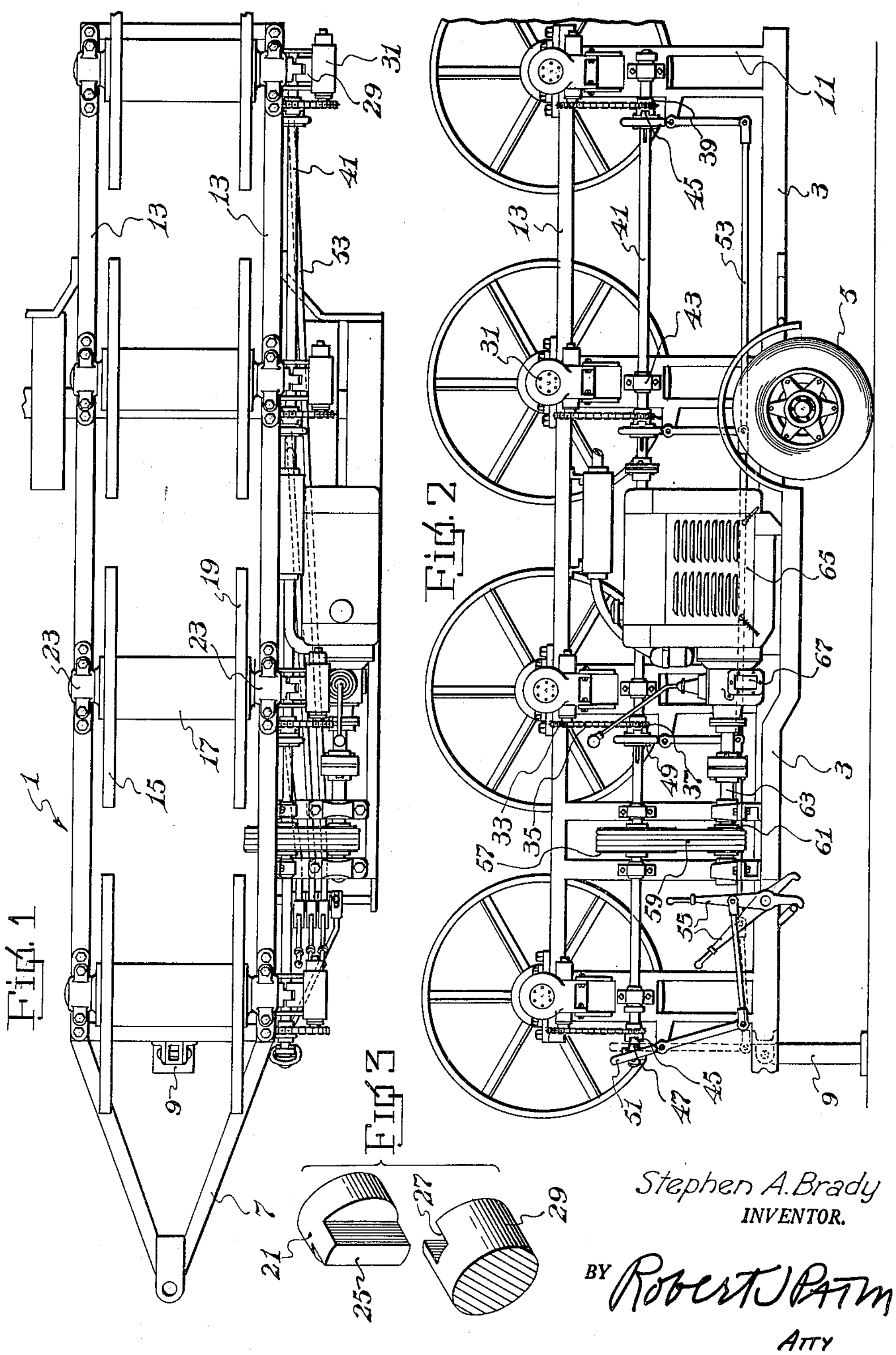
FIGURE 1 is a plan view of a multiple reeling device according to the present invention.
FIGURE 2 is a side elevational view of the device of FIGURE 1.
FIGURE 3 is an enlarged fragmentary assembly view of a detachable driving connection forming a portion of the present invention.

Referring now to the drawing in greater detail, there is shown a vehicle indicated generally at 1 having a chassis 3 which is greatly elongated in the direction of movement of the vehicle, and a pair of wheels 5 one on each side of the chassis adjacent the rear end thereof. At the front end of the chassis is a towing tongue 7 and centrally of the chassis adjacent the forward end thereof is a pivotally mounted foot 9 on which, along with wheels 5, the vehicle is supported when at rest. In this way, the vehicle may be towed from place to place behind a draft vehicle which may then proceed to another job site, leaving the reeling device of the present invention supported on wheels 5 and foot 9.

Upstanding from chassis 3 is a plurality of pairs of supporting standards 11, the standards of each pair being disposed on opposite sides of chassis 3. A horizontal supporting member 13 extends substantially full length of the vehicle on each side of chassis 3 and is supported at the top of the line of standards on its associated side of the vehicle. The two supporting members 13 are disposed parallel to each other in a horizontal plane.

Supported on the vehicle for rotation about parallel spaced horizontal axes is a plurality of reels 15 each having a spool 17 and a pair of opposite end flanges 19. Each reel 15 has in unitary assembly therewith a bearing shaft 21 extending axially endwise on each side thereof. A pair of pillow blocks 23 is provided for each reel 15, one mounted on each supporting member 13. The bearing shafts 21 are mounted for rotation in their corresponding pillow blocks 23, and at least the upper half of each pillow block is removable from the other or underhalf so as to permit emplacement and removal of the reel assemblies.

An end of the bearing shaft of each reel extends outwardly beyond its associated pillow block on the side thereof opposite the major portion of the reel and terminates in a tongue 25 adapted slidably but drivingly to interfit with a complementary groove 27 of a driven stub shaft 29 individual to and axially aligned with each reel assembly. Thus, when the groove 27 of any selected shaft 29 is disposed approximately vertical and the upper halves of the associated pillow blocks 23 are removed, the reel assembly may be lifted vertically out of its seat on the vehicle without disturbing any other portion of the structure of the vehicle.

At its end opposite groove 27, each stub shaft 29 is provided with a coaxial gear in mesh with a rotatable worm of a Ramsey worm and gear unit 31, the worm being rotatable about an axis generally tangential to the gear as is conventional in this unit. Secured to one end of the worm shaft of each unit 31 is a relatively large sprocket 33 driven by a sprocket chain 35 which in turn is driven by a relatively much small sprocket 37, so that during a given period of time sprocket 37 will complete many more revolutions than sprocket 33.

Each sprocket 37 is mounted on a collar 39 journalled for free rotation on a common jack shaft 41 which in turn is journalled for rotation in a bracket 43 on the outer side of each of the standards 11 on one side of the vehicle. Thus, jack shaft 41 is parallel to supporting members 13 and to the worm shafts of units 31 but is perpendicular to the axes of the reel assemblies. Each collar 39 has a groove 45 therein in which is receivable a tongue 47 on a collar 49 keyed to jack shaft 41 for axial sliding movement therealong and rotation therewith. Collars 39 and 49 form the two selectively interengageable clutch halves of a yoke shift dog clutch assembly. Collar 49 rotates within a yoke shift ring 51 which in turn is selectively movable in either direction axially of jack shaft 41 by means of clutch control linkage 53 actuable by manipulation of a clutch control lever 55, one individual to the control of each reel assembly. The clutch control levers 55 are arranged generally in a group for convenience of manipulation by a single operator. In this way, by movement of the appropriate lever 55 in a given direction, the operator can establish or break the driving connection between the jack shaft and any reel by engaging or disengaging the locking halves of the corresponding yoke shift dog clutch.

Secured to jack shaft 41 is a relatively large belt pulley 57 driven by a drive belt 59 which in turn is driven by a relatively smaller pulley 61 secured to a drive shaft 63 parallel to jack shaft 41. Thus, jack shaft 41 is driven by drive shaft 63 and rotates at a substantially lesser speed than drive shaft 63. Drive shaft 63, in turn, is driven by a motor 65 which in the illustrated embodiment is a gasoline engine and is drivingly coupled to drive shaft 63 through a standard gear shift transmission 67 having forward and reverse drives and a neutral position during which motor 65 idles without turning drive shaft 63.

The operation of a device according to the present invention is as follows:

With motor 65 running, transmission 67 is shifted to the appropriate drive direction whereupon drive shaft 63 is caused to rotate in a selected direction, and with it jack shaft 41 at a substantially lower speed. If all the dog clutches on jack shaft 41 are engaged, then all the reels 15 will be driven. But when a given strand being wound or unwound upon or from a particular reel 15 becomes too taut or at the other extreme tends to sag, then the appropriate control lever 55 may be manipulated to disengage the corresponding dog clutch and stop rotation of the reel in question, or that particular reel may be left running and the other reels stopped. It will of course be understood that worm and gear unit 31 is of a low gear ratio such that the worm acts as a brake on the gear thereby to prevent movement of reel 15 in the absence of a driving connection thereto. In addition to selectively driving or stopping individual reels 15, all the reels 15 may be driven simultaneously or in any combination of a plurality of those reels; or by throwing transmission 67 into neutral, all the reels may be simultaneously stopped.

When an individual reel 15 becomes full or empty or when it is otherwise required to remove an individual reel from the vehicle, it is necessary only to operate that reel until it turns to a position in which tongue 25 on its outwardly extending bearing shaft 21 is roughly vertically disposed and to remove the upper halves of the pillow blocks 23 at each end of the reel. Thereafter, a hoist or other conveyance may be used to lift the reel out of its cradle without disturbing driven stub shaft 29 or any other portion of the reel drive or of the vehicle itself.

In view of the foregoing description, it will be obvious that all of the initially recited objects of the present invention have been achieved.

Although the present invention has been described and illustrated in connection with preferred embodiments, it is to be understood that modifications and variations may be resorted to without departing from the spirit of this invention, as those skilled in the art will readily understand. Such modifications and variations are considered to be within the purview and scope of the present invention as defined by the appended claim.

What is claimed is:

A reeling device comprising a wheeled vehicle having a chassis elongated in the direction of movement of the vehicle, a plurality of reels mounted on the chassis for rotation about parallel axes, said axes being spaced apart lengthwise of the chassis and the reels being in line with each other lengthwise of the chassis, a motor mounted on the chassis for rotating the reels, a drive shaft connected to be rotated by the motor, a jack shaft mounted for rotation on and extending at least a major portion of the length of the chassis, means drivably interconnecting the drive shaft and the jack shaft to rotate the jack shaft at a substantially lower speed than the drive shaft, a plurality of individual drive connections between the jack shaft and the reels to rotate the reels at a substantially lower speed than the jack shaft, means for selectively interrupting the driving connection between the jack shaft and any of the reels, a transmission between the motor and the jack shaft having reverse drives and a neutral position in which the motor idles without turning the drive shaft, the transmission and the drive shaft interconnecting the motor and the jack shaft for rotation of the jack shaft independently of the vehicle wheels.

References Cited in the file of this patent

UNITED STATES PATENTS

| | | |
|---|---|---|
| 910,415 | Pohl | Jan. 19, 1909 |
| 1,620,844 | Walker | Mar. 15, 1927 |
| 2,046,424 | Palen | July 7, 1936 |
| 2,570,573 | Liboiron | Oct. 9, 1951 |
| 2,867,390 | Anrig | Jan. 6, 1959 |
| 2,868,467 | Lewis | Jan. 13, 1959 |